United States Patent [19]

Gutlhuber

[11] Patent Number: 5,161,605
[45] Date of Patent: Nov. 10, 1992

[54] TUBULAR REACTOR AND METHOD

[75] Inventor: Friedrich Gutlhuber, Metten, Fed. Rep. of Germany

[73] Assignee: Deggendorfer Werft und Eisenbau GmbH, Fed. Rep. of Germany

[21] Appl. No.: 573,198

[22] PCT Filed: Dec. 13, 1988

[86] PCT No.: PCT/EP88/01146
§ 371 Date: Oct. 12, 1990
§ 102(e) Date: Oct. 12, 1990

[87] PCT Pub. No.: WO90/06807
PCT Pub. Date: Jun. 28, 1990

[51] Int. Cl.⁵ .............................................. F28F 13/00
[52] U.S. Cl. ........................................ 165/1; 165/103; 165/160; 422/201
[58] Field of Search ............. 165/103, 160, 161, 1; 422/201

[56] References Cited

U.S. PATENT DOCUMENTS

| | | | |
|---|---|---|---|
| 1,833,611 | 11/1931 | Kirgan | 165/103 |
| 2,480,675 | 8/1949 | Shaw et al. | 165/103 X |
| 4,127,389 | 11/1978 | Hackemesser et al. | 422/201 |

FOREIGN PATENT DOCUMENTS

| | | | |
|---|---|---|---|
| 310157 | 4/1929 | United Kingdom | 165/103 |
| 530357 | 12/1940 | United Kingdom | 165/103 |

Primary Examiner—Allen J. Flanigan
Attorney, Agent, or Firm—Marshall, O'Toole, Gerstein, Murray & Bicknell

[57] ABSTRACT

In a tubular reactor (2) for catalytic chemical gas-phase reactions with symparallel [sic] guidance of the heat-exchanger, a partial stream of the heat-exchanger medium, this partial stream immediately neighboring the inlet side of the tube plate (6), is introduced through a by-pass channel (26) arranged in the center of the bank of tubes (4), by-passing the bank of tubes, and introduced at a point which is downstream to the discharge area of the heat-exchanger. In this way, undersirable severe local cooling in the reaction area of the bank of tubes (4) can be avoided.

24 Claims, 3 Drawing Sheets

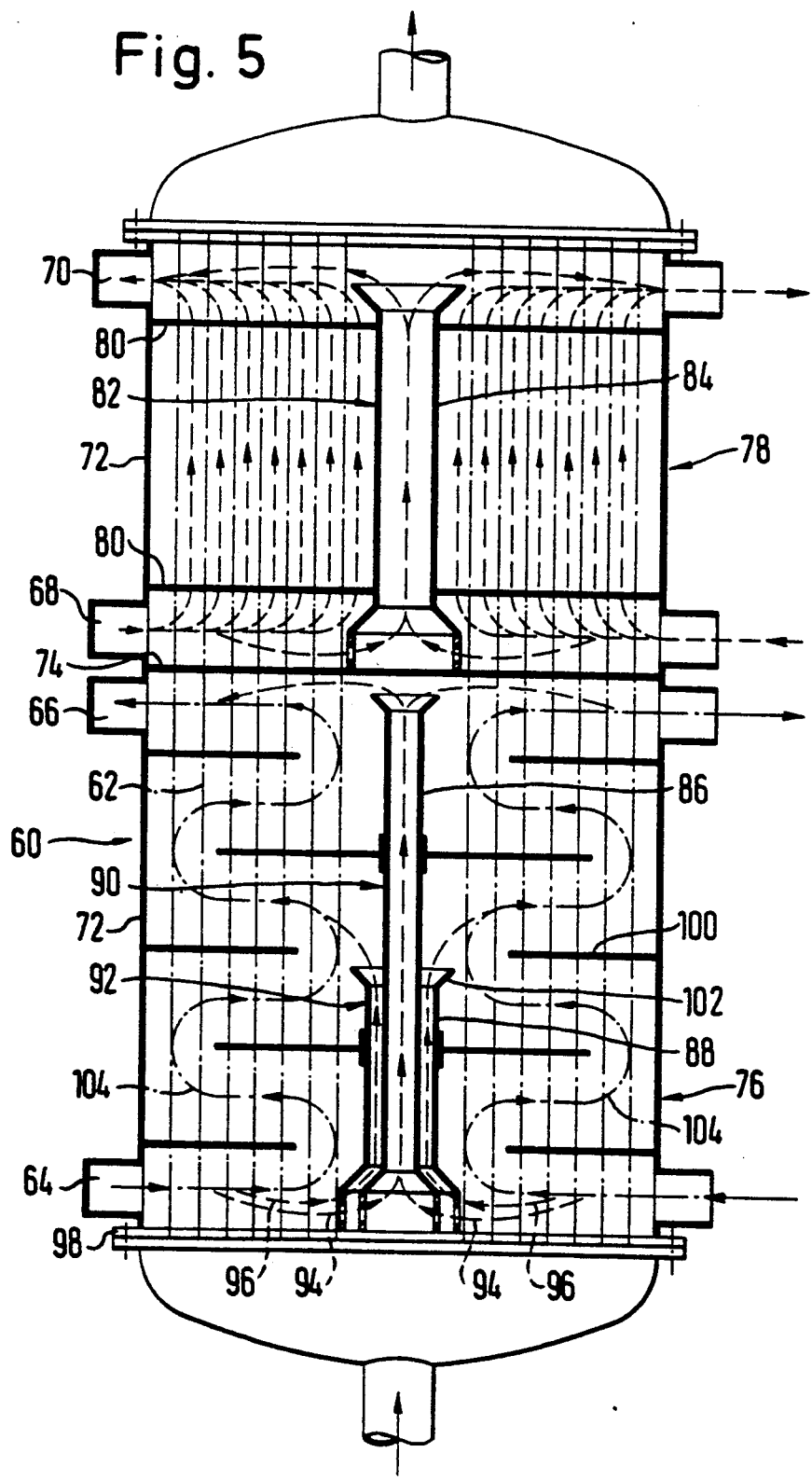

TUBULAR REACTOR AND METHOD

The invention is concerned with a tubular reactor according to the main concept of claim 1.

Such tubular reactors represent a frequently desired and many times unavoidable structural and operational form of large chemical reactors. They can be designed with parallel, radial, transverse flow or double-transverse flow heat-exchanger, where the main directional flow in the heat-exchanger, produced by components such as deflectors and/or distributor plates, is defined with respect to the reactor tubes. In all cases, the heat-exchange medium entering the reactor housing is forced so that a substantial part will follow a path first along the tube plate or separator plate. With increasing length of the respective transverse flow and with increasing temperature difference there between the reaction gas and heat-exchanger, the problem, that the portion of the heat-exchange medium that flows more or less directly along the tube plate or separating plate will be cooled down to an undesirably great extent, becomes more severe. This is understandable if one keeps in mind that, for example, the reaction gas entering there may have a temperature of 100° or 150° C., while the reaction temperature and, consequently the temperature of the heat exchanger, is 400° C. The temperature differences between the various layers of the heat-exchanger that are produced by the disproportionately strong cooling mentioned above will remain to some extent even during the rest of the flow and will therefore lead to different temperatures and different temperature profiles at the individual contact tubes, and this may result in an adverse influence on yield and selectivity. An attempt to reduce these temperature differences by increasing the flow velocity of the heat-exchanger medium would result in a disproportionately large increase of pump performance and thus energy consumption.

Therefore, the task of the invention is to create a tubular reactor according to the main concept, in such a way that the temperatures and temperature profiles of the individual contact tubes can be kept approximately equal without this requiring a significant increase in pump power.

According to the invention, this task is solved by the characterizing part of claim 1. The Subclaims give further advantageous modes of execution.

The purpose of the by-pass channel is that, the portion of the heat-exchange medium which is cooled disproportionately strongly at the tube plate or separating plate near the inlet is guided directly to near the outlet region of the heat-exchange medium or at least to a point near to this within the reactor housing, by by-passing the contact tubes as well as other flow-conducting structural parts, such as deflector plates and distributor plates, and there its relatively low temperature is harmless or even desirable. For example, this area can be at the height of the hot spot and there again inside a deflector plate extending inward.

The construction of the by-pass channel according to the invention is simple. It requires a free space in the middle of the bank of tubes, but such a space is expedient anyway in the case of large reactors for flow-technological reasons, as presented in DE Patent 25 59 661.

Below, some modes of execution of the tubular reactors according to the invention will be described in more detail, with the aid of drawings.

Figure 1:
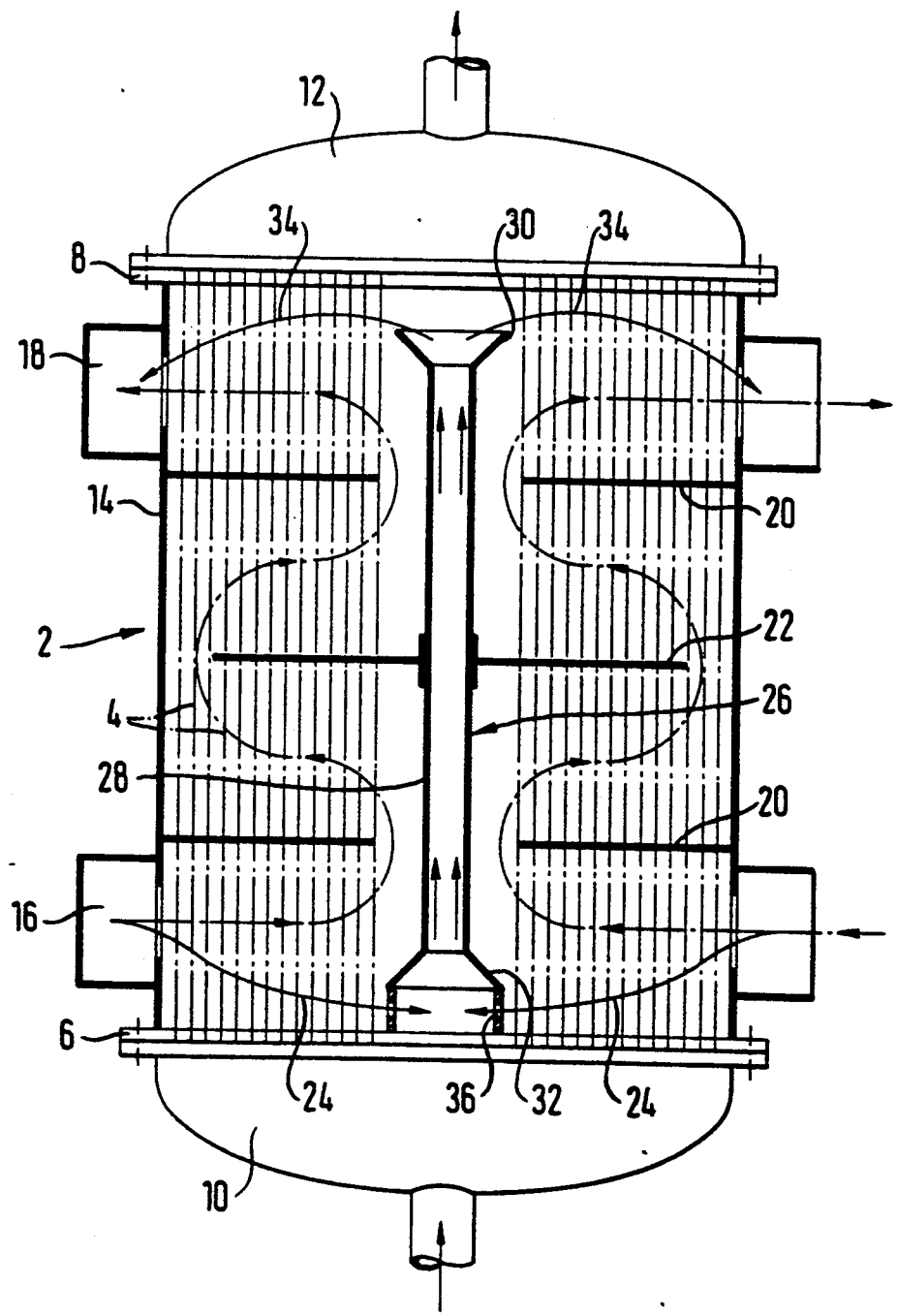
FIG. 1 shows a vertical tubular reactor with cylindrical tubes, shown schematically as the longitudinal cross-section, with the reaction gas and heat-exchange medium entering at the lower end.
Figure 2:
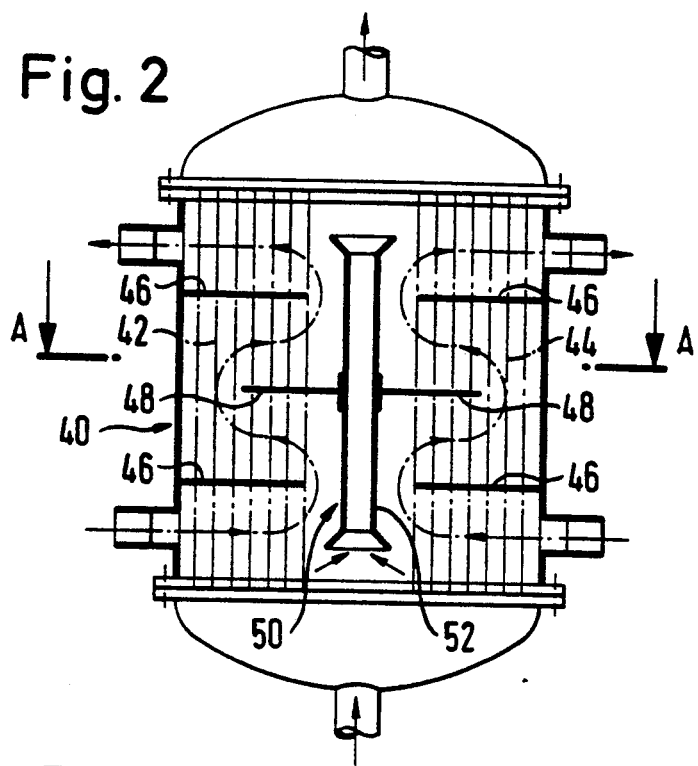
FIG. 2 is a similar representation of the tubular reactor with two groups of opposing tubes and double transverse flow of the heat-exchange medium.
Figure 3:
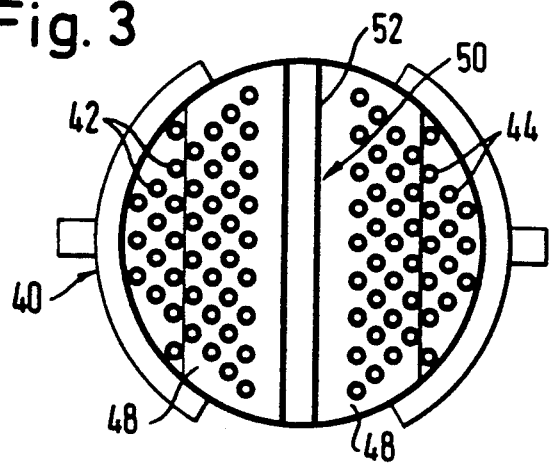
Figure 4:
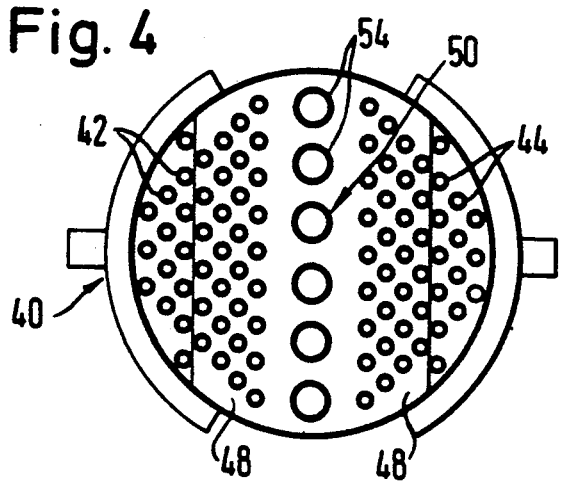

FIGS. 3 and 4 each show a schematic cross-section of the reactor according to FIG. 2, approximately at the height of line A—A, with different designs of the by-pass channel and FIG. 5 is again a similar representation to FIG. 1 of a tubular reactor with a cylindrical bank of tubes, whereby the space for the heat-exchanger in the reactor housing is of course divided by a separator into two superimposed separated sections, corresponding to highly different heat-exchange requirements.

The tubular reactor 2, shown in FIG. 1, contains a cylindrical bank of reaction tubes 4 which ends in tube plates 6 and 8. The reaction gas is introduced to the bank of tubes 4 from the bottom through a hood 10, while a similar upper hood 12 collects the reacted gas that leaves the bank of tubes. The inner space of reactor 2 between tube plates 6 and 8 is filled, outside the bank of tubes 4, with a heat-exchange medium, for example, a salt melt, which surrounds the tubes. This medium is introduced into reactor housing 14 near the lower tube plate 6, radially through an annular channel 16 and is discharged near upper tube plate 8 through an annular channel 18, and then into the heat-exchanger which is outside the reactor and is not shown. Between the two tube plates 6 and 8, the heat-exchange medium is forced to flow in a meandering manner around deflecting plates 20 and 22 in various planes in order to pass around the bank of tubes, substantially in the form of a "transverse flow", that is, radially in this case. Deflecting plates 20 and 22 usually have openings for the individual tubes but leaving a gap between the plate and the tube and these individual gaps can be dimensioned in such a way that they regulate the part of the stream of the heat-exchange medium that can pass through them in the axial direction of the reactor, in order to provide to the bank of tubes 4 a desired temperature field. Reactor 2 is of such a type that it allows inside the bank of tubes 4 a coaxial cylindrical space that does not contain any contact tubes.

While the mean reaction temperature in the bank of tubes 4 and thus also the temperature of the heat-exchange medium is, for example, at about 400° C., regardless of whether the reaction is exothermic or endothermic, the reaction gas enters through the hood 10 into the bank of tubes at a temperature of approximately 100° C. Naturally, as a result of this, the lower tube plate 6 is cooled considerably and this cooling effect is also imparted to the layers of the heat-exchange medium neighboring it.

Since these layers are not at rest, but form a partial stream, as indicated by arrows 24, normally, this under-cooled partial stream cools the bank of tubes at the points that cannot be controlled satisfactorily to temperatures which are harmful to the course of the reaction.

In order to prevent this, now, in reactor 2 shown here, for which a by-pass channel 26 is provided for the partial stream indicated with arrow 24; in this case, the by-pass channel consists of a coaxial tube 28 with funnel-like expansions 30 and 32 at the two ends near tube plates 6 and 8, respectively. The partial stream of the heat-exchange medium designated by arrows 24 will be introduced into this by-pass channel 26 directly from the outlet end of the bank of tubes 4, without being able to come into contact further with the bank of tubes. At the outlet end of the bank of tubes 4, near tube plate 8, this partial stream flows outward according to arrows 34, to annular channel 18, approximately in the same way as it did from annular channel 16 to the center of the bank of tubes. It can be assumed that the reaction is completed at the discharge end of bank of tubes 4 and that there enhanced cooling of the reacted gases is desirable anyway.

In order to improve the flow of the said partial stream in and through pipe 28, the cylindrical peripheral inlet cross-section between tube plate 6 and enlarged part 32 can be covered with a sieve-like perforated plate 36, as shown.

FIG. 2 shows a tubular reactor 40, which, instead of a hollow cylindrical bank of tubes according to FIG. 1, consists of two groups of bank of tubes 42 and 44, set opposite to one another at a distance and, correspondingly, the heat-transfer medium which enters from the opposite sides flows through them in what is called a double transverse flow, while otherwise the internal construction with alternating deflection plates 46 and 48 corresponds in principle to that shown in FIG. 1.

Now, in this case, a by-pass channel 50 is arranged in the space between the two groups of bank of tubes, 42 and 44. FIGS. 3 and 4 show two different modes of execution of these.

According to FIG. 3, the by-pass channel 50 consists substantially of a box-like guide channel 52, which extends over the entire width of reactor 40, and, according to FIG. 4, of a row of individual pipes 54. In each case, again enlargements can be provided at both ends, similarly to enlargements 30 and 32 in FIG. 1, and also in order to achieve better flow, a perforated plate similar to perforated plate 36 may be located at the inlet cross-section.

Reactor 60 according to FIG. 5 is again similar to that of FIG. 1 and has a hollow cylindrical bank of tubes 62 and annular channels 64 to 70. However, in this case, the reactor housing 72 is subdivided into two superimposed heat-exchanger sections 76 and 78, which are at least substantially separated from one another, by a separator plate 74 through which the bank of tubes passes, as it is shown approximately the same way in DE-OS 2,201,528. Similarly, here, for example, instead of the alternating deflector plates 20 and 22, in heat-exchanger section 78, continuous [passing through] distributor plates 80 with annular gaps around the individual reactor tubes are provided between the respective annular channel 68 and 70 in the immediate neighborhood of these. Through these distributor plates, the flow of the heat-exchange medium will become substantially directed in the axial direction. However, this does not change the situation at all that a partial stream of the heat-exchange medium entering through the respective annular channel 68 will undergo an undesirably severe temperature change as a result of the separator plate, namely the partial stream, which passes in the immediate neighborhood of separator plate 74. For this reason, again a by-pass channel 82 is provided, which is in the form of a central tube 84 that is enlarged on both sides, as it was done in the case of reactor 2 according to FIG. 1.

Similarly, the heat-exchanger section 76 under it has a central tube 86, but, in this example, this is surrounded coaxially, at a distance, by another tube 88, in order to provide two separate by-pass channels, 90 and 92. In this way, the partial stream of the heat-exchanger, designated by arrows 94 and 96, can be removed from the area of the lower tube plate 98 in layers, whereby one must assume that the part which goes through the gap between guide tubes 86 and 88 will exhibit a lower temperature difference from the entering heat-exchange medium than that which passes through tube 86. This can be utilized in the present case by introducing the part, that was cooled last, to bank of tubes 62 at a point where one would expect a higher temperature to start with. This point is usually in the area of the hot spot, such as within a radially internally directed deflecting plate, for example, 100. Accordingly, one allows tube 88 to end in this region, again in an enlargement 102, so that the partial stream of the heat-exchange medium leaving there can mix with the main stream, the path of which is substantially that shown by lines 104, which have the arrows.

Naturally, further variations and possible combinations that differ from the above are possible.

I claim:

1. In a tubular reactor for catalytic chemical reactions, with exothermic or endothermic heat of reaction, in which a heat-exchange medium flows around a bank of reaction tubes extending between tube plates and is introduced into a reactor housing substantially in a normal direction to the axis of the tubes, and directed from an outside of the housing in an area near an inlet area of the reaction fluid, the improvement comprising a continuously open by-pass channel, disposed substantially longitudinally centrally within the bank of reaction tubes, conducting a portion of the heat exchange medium which has entered in close proximity to the tube plate at an inlet side of the reaction fluid through the by-pass channel to an area downstream with regard to the reaction fluid without therebetween contacting the reaction tubes, thus to obtain approximately uniform temperatures within planes across the bank of reaction tubes during operation.

2. In a tubular reactor according to claim 1, wherein the reaction tubes are disposed in the form of a cylindrical bank of tubes and further including a heat-exchange medium inlet and outlet disposed to direct the heat exchange medium radially with respect to the reaction tubes, wherein there are no reaction tubes at the longitudional center of the bank of reaction tubes, and wherein the by-pass channel consists essentially of an elongated conduit disposed coaxially in the center of the bank of reaction tubes.

3. In a tubular reactor according to claim 1 further including two oppositely disposed banks of reaction tubes, wherein the by-pass channel comprises at least one elongated conduit arranged between the two opposed banks of reaction tubes.

4. In a tubular reactor according to claim 3, wherein the by-pass channel includes a funnel-like enlargement on one end.

5. In a tubular reactor according to claim 3 wherein the by-pass channel includes a funnel-like enlargement on both ends.

6. In a tubular reactor according to claim 1 wherein the by-pass channel includes a plurality of coaxial elongated conduits.

7. In a tubular reactor according to claim 6 wherein one or more of the by-pass conduits discharge heat exchange medium in indirect heat exchange contact with the reaction tubes.

8. In a tubular reactor according to claim 6 wherein one or more of the by-pass conduits discharge heat exchange medium in a direction toward a deflecting plate disposed within the reactor.

9. In a method of heating or cooling a reaction fluid to provide a proper temperature of reaction for the reaction fluid in catalytic reaction of the reaction fluid comprising flowing the reaction fluid in an axial flow path through a plurality of reaction fluid-carrying conduits disposed within a reactor housing, and flowing a heat exchange medium through the reaction housing for indirect heat exchange between the reaction fluid and the heat exchange medium to render a temperature of the reaction fluid suitable for chemical reaction, the improvement comprising continuously directing an overheated or, respectively, overcooled inlet portion of the heat exchange medium through an elongated by-pass channel disposed longitudinally centrally within the reactor such that the by-passed portion of the heat exchange medium does not provide any substantial heat exchange with the reaction fluid.

10. In the method of claim 9 further including directing a portion of the heat exchange medium substantially longitudionally centrally between the reaction tubes to avoid indirect heat exchange between the by-passed heat exchange medium and the inlet reaction fluid.

11. In the method of claim 10, further including directing the by-passed portion of the heat-exchange medium between two oppositely disposed banks of reaction tubes, said by-pass channel including at least one elongated conduit arranged between the two opposed banks of reaction tubes.

12. In the method of claim 10, further including directing the by-passed portion of the heat-exchange medium through a sieve-like perforated plate disposed near an inlet end of the by-pass channel and in fluid communication with the by-pass channel for the entry of the heat exchange medium into the by-pass channel.

13. In the method of claim 9 further including directing the by-passed portion of the heat-exchange medium through a plurality of coaxial, elongated by-pass conduits.

14. In the method of claim 13, further including the step of discharging heat exchange medium from one or more of the coaxial by-pass conduits in indirect heat exchange contact with the reaction tubes.

15. In the method of claim 14, including discharging by-passed heat exchange medium from one or more of the by-pass conduits in a direction toward a deflecting plate disposed within the reactor.

16. In a method of heating or cooling a reaction fluid to provide a proper temperature of reaction for the reaction fluid comprising flowing the reaction fluid in an axial flow path through a plurality of reaction fluid-carrying conduits disposed within a reactor housing, and flowing a heat exchange medium through the reaction housing for indirect heat exchange between the reaction fluid and the heat exchange medium to render a temperature of the reaction fluid suitable for chemical reaction, the improvement comprising continuously directing an overheated or, respectively, overcooled inlet portion of the heat exchange medium through an elongated by-pass channel disposed in an area of the reactor such that the by-passed portion of the heat exchange medium does not provide any substantial heat exchange with the reaction fluid.

17. In a tubular reactor for catalytic chemical reactions, with exothermic or endothermic heat of reaction, in which a heat-exchange medium flows around a bank of reaction tubes and is introduced into a reactor housing substantially in a normal direction to the axis of the tubes, and directed from an outside of the housing in an area near an inlet area of the reaction fluid, said reactor housing including a heat-exchange medium inlet and outlet disposed to direct the heat-exchange medium radially with respect to the reaction tubes and said reaction tubes being disposed in the form of a cylindrical bank of tubes wherein no reaction tubes are provided at the longitudional center of the bank of reaction tubes, the improvement comprising a by-pass channel including a funnel-like enlargement on one end, said by-pass channel consisting essentially of an elongated conduit disposed coaxially in the center of the bank of reaction tubes, by-passing the reaction tubes form an area near the reaction fluid inlet to an area closer to a reaction fluid outlet, so that a partial stream of the heat-exchange medium in an intermediate area is conveyed through the by-pass channel to provide more uniform heat transfer within the reactor.

18. In a tubular reactor for catalytic chemical reactions, with exothermic or endothermic heat of reaction, in which a heat-exchange medium flows around a bank of reaction tubes and is introduced into a reactor housing substantially in a normal direction to the axis of the tubes, and directed from an outside of the housing in an area near an inlet area of the reaction fluid, said reactor housing including a heat-exchange medium inlet and outlet disposed to direct the heat-exchange medium radially with respect to the reaction tubes and said reaction tubes being disposed in the form of a cylindrical bank of tubes wherein no reaction tubes are provided at the longitudional center of the bank of reaction tubes, the improvement comprising a by-pass channel including a funnel-like enlargement on both ends, said by-pass channel consisting essentially of an elongated conduit disposed coaxially in the center of the bank of reaction tubes, by-passing the reaction tubes form an area near the reaction fluid inlet to an area closer to a reaction fluid outlet, so that a partial stream of the heat-exchange medium in an intermediate area is conveyed through the by-pass channel to provide more uniform heat transfer within the reactor.

19. In a tubular reactor for catalytic chemical reactions, with exothermic or endothermic heat of reaction, in which a heat-exchange medium flows around a bank of reaction tubes and is introduced into a reactor housing substantially in a normal direction to the axis of the tubes, and directed from an outside of the housing in an area near an inlet area of the reaction fluid, said reactor housing including a heat-exchange medium inlet and outlet disposed to direct the heat-exchange medium radially with respect to the reaction tubes and said reaction tubes being disposed in the form of a cylindrical bank of tubes wherein no reaction tubes are provided at the longitudional center of the bank of reaction tubes, the improvement comprising a by-pass channel including a funnel-like enlargement on one end, said by-pass channel consisting essentially of an elongated conduit disposed coaxially in the center of the bank of reaction tubes, by-passing the reaction tubes from an area near the reaction fluid inlet to an area closer to a reaction fluid outlet, so that a partial stream of the heat-exchange medium in an intermediate area is conveyed through the by-pass channel to provide more uniform heat transfer within the reactor, wherein said by-pass channel includes a sieve-like perforated plate disposed near an inlet end in fluid communication with the by-pass channel for the entry of the heat-exchange medium into the by-pass channel.

20. In a method of heating or cooling a reaction fluid to provide a proper temperature of reaction for the reaction fluid comprising flowing the reaction fluid in an axial flow path through a plurality of reaction fluid-carrying conduits disposed within a reactor housing, and flowing a heat-exchange medium through the reactor housing for indirect heat-exchange between the reaction fluid and the heat-exchange medium, the improvement comprising directing an inlet portion of the heat-exchange medium through a funnel-like enlargement into one end of an elongated by-pass channel disposed in an area of the reactor such that the by-passed portion of the heat-exchange medium does not provide any substantial heat-exchange with the reaction fluid.

21. In a method of heating or cooling a reaction fluid to provide a proper temperature of reaction for the reaction fluid comprising flowing the reaction fluid in an axial flow path through a plurality of reaction fluid-carrying conduits disposed within a reactor housing, and flowing a heat-exchange medium through the reactor housing for indirect heat-exchange between the reaction fluid and the heat-exchange medium, the improvement comprising directing an inlet portion of the heat-exchange medium through a funnel-like enlargement into one end of an elongated by-pass channel disposed longitudionally centrally between the reaction fluid-carrying conduits such that the by-pass portion of the heat exchange medium does not provide any substantial heat exchange with the reaction fluid.

22. In a method of heating or cooling a reaction fluid to provide a proper temperature of reaction for the reaction fluid comprising flowing the reaction fluid in an axial flow path through a plurality of reaction fluid-carrying conduits disposed within a reactor housing, and flowing heat-exchange medium through the reactor housing for indirect heat-exchange between the reaction fluid and the heat-exchange medium, the improvement comprising directing an inlet portion of the heat-exchange medium through a funnel-like enlargement into one end of an elongated by-pass channel disposed in an area of the reactor such that the by-passed portion of the heat-exchange medium does not provide any substantial heat-exchange with the reaction fluid and directing an outlet of the by-passed heat-exchange medium through another funnel-like enlargement on the other end of the by-pass channel.

23. In a method of heating or cooling a reaction fluid to provide a proper temperature of reaction for the reaction fluid comprising flowing the reaction fluid in an axial flow path through a plurality of reaction fluid-carrying conduits disposed within a reactor housing, and flowing a heat-exchange medium through the reactor housing for indirect heat-exchange between the reaction fluid and the heat-exchange medium, the improvement comprising directing an inlet portion of the heat-exchange medium through a funnel-like enlargement into one end of an elongated by-pass channel disposed longitudionally centrally between the reaction fluid-carrying conduits such that the by-passed portion of the heat exchange medium does not provide any substantial heat exchange with the reaction fluid, and directing an outlet of the by-passed heat-exchange fluid through another funnel-like enlargement on the other end of the by-pass channel.

24. In a method of heating or cooling a reaction fluid to provide a proper temperature of reaction for the reaction fluid comprising flowing the reaction fluid in an axial flow path through a plurality of reaction fluid-carrying conduits disposed within a reactor housing, and flowing a heat-exchange medium through the reactor housing for indirect heat-exchange between the reaction fluid and the heat-exchange medium, the improvement comprising directing an inlet portion of the heat-exchange medium through a funnel-like enlargement into one end of an elongated by-pass channel disposed longitudionally centrally between the reaction fluid-carrying conduits such that the by-passed portion of the heat exchange medium does not provide any substantially heat exchange with the reaction fluid, wherein said by-pass channel includes a sieve-like perforated plate disposed near an inlet end in fluid communication with the by-pass channel for the entry of the heat-exchange medium int the by-pass channel.

* * * * *